United States Patent
Diamond et al.

(10) Patent No.: US 12,208,800 B2
(45) Date of Patent: Jan. 28, 2025

(54) METHODS AND APPARATUSES FOR DYNAMIC VEHICLE ACCESS PERMISSIONING ANALYSIS AND HANDLING

(71) Applicant: FORD GLOBAL TECHNOLOGIES, LLC, Dearborn, MI (US)

(72) Inventors: Brendan F. Diamond, Grosse Pointe, MI (US); Keith Weston, Canton, MI (US); Michael Alan McNees, Flat Rock, MI (US); Andrew Denis Lewandowski, Sterling Heights, MI (US); Jordan Barrett, Milford, MI (US)

(73) Assignee: Ford Global Techologies, LLC, Dearborn, MI (US)

( * ) Notice: Subject to any disclaimer, the term of this patent is extended or adjusted under 35 U.S.C. 154(b) by 289 days.

(21) Appl. No.: 17/833,352

(22) Filed: Jun. 6, 2022

(65) Prior Publication Data

US 2023/0391338 A1    Dec. 7, 2023

(51) Int. Cl.
*B60W 30/182* (2020.01)
*B60W 40/13* (2012.01)
*B60W 50/08* (2020.01)
*B60W 50/14* (2020.01)
*H04W 4/021* (2018.01)

(52) U.S. Cl.
CPC .......... *B60W 30/182* (2013.01); *B60W 40/13* (2013.01); *B60W 50/085* (2013.01); *B60W 50/14* (2013.01); *H04W 4/021* (2013.01); *B60W 2556/45* (2020.02)

(58) Field of Classification Search
CPC .. B60W 30/182; B60W 40/13; B60W 50/085; B60W 50/14; B60W 2556/45; H04W 4/021; G01C 21/3461; G08G 1/207
See application file for complete search history.

(56) References Cited

U.S. PATENT DOCUMENTS

| | | | |
|---|---|---|---|
| 6,313,791 B1 | 11/2001 | Klanke | |
| 6,968,266 B2 | 11/2005 | Ahmed-Zaid et al. | |
| 7,260,465 B2 | 8/2007 | Waldis et al. | |
| 9,676,390 B2 | 6/2017 | Fairgrieve et al. | |
| 2013/0326595 A1* | 12/2013 | Myers | G07C 9/00571 726/4 |
| 2017/0213458 A1* | 7/2017 | Gordon | E01F 13/04 |
| 2018/0096270 A1* | 4/2018 | High | G07C 9/00896 |

(Continued)

*Primary Examiner* — Ashley L Redhead, Jr.
(74) *Attorney, Agent, or Firm* — Joseph Zane; Brooks Kushman P.C.

(57) ABSTRACT

A system includes one or more processors configured to determine that a vehicle is attempting to enter an area designated for off-road travel. The processors are also configured to access use-restrictions stored in a database and associated with the area, the use-restrictions defining at least one vehicle constraint required for the vehicle to travel over one or more locations that are part of the area, the use restrictions defining at least one of vehicle control limiting or vehicle weight maximums. The processors are further configured to determine whether the vehicle meets the use-restrictions based on an assessment of vehicle characteristics compared to the use-restrictions and responsive to determining that the vehicle meets the restrictions, providing the vehicle with a digital access pass to the area.

18 Claims, 4 Drawing Sheets

(56) References Cited

U.S. PATENT DOCUMENTS

| | | | |
|---|---|---|---|
| 2018/0364055 A1* | 12/2018 | Laur | G08G 1/096827 |
| 2019/0265064 A1* | 8/2019 | Koenig | G07C 5/008 |
| 2019/0385382 A1 | 12/2019 | Davidson | |
| 2020/0257292 A1 | 8/2020 | Zhao et al. | |
| 2021/0061273 A1* | 3/2021 | Poulin | H04W 4/021 |
| 2021/0258719 A1* | 8/2021 | Bosworth | H04W 4/44 |
| 2022/0289187 A1* | 9/2022 | Wilson | B60W 30/143 |
| 2023/0074387 A1* | 3/2023 | Goyal | G05D 1/0088 |
| 2023/0110101 A1* | 4/2023 | Lewandowski | B60W 40/105 |
| | | | 701/93 |
| 2023/0245566 A1* | 8/2023 | Okabe | G08G 1/168 |
| | | | 701/36 |
| 2023/0303117 A1* | 9/2023 | Schneemann | B60W 60/001 |

* cited by examiner

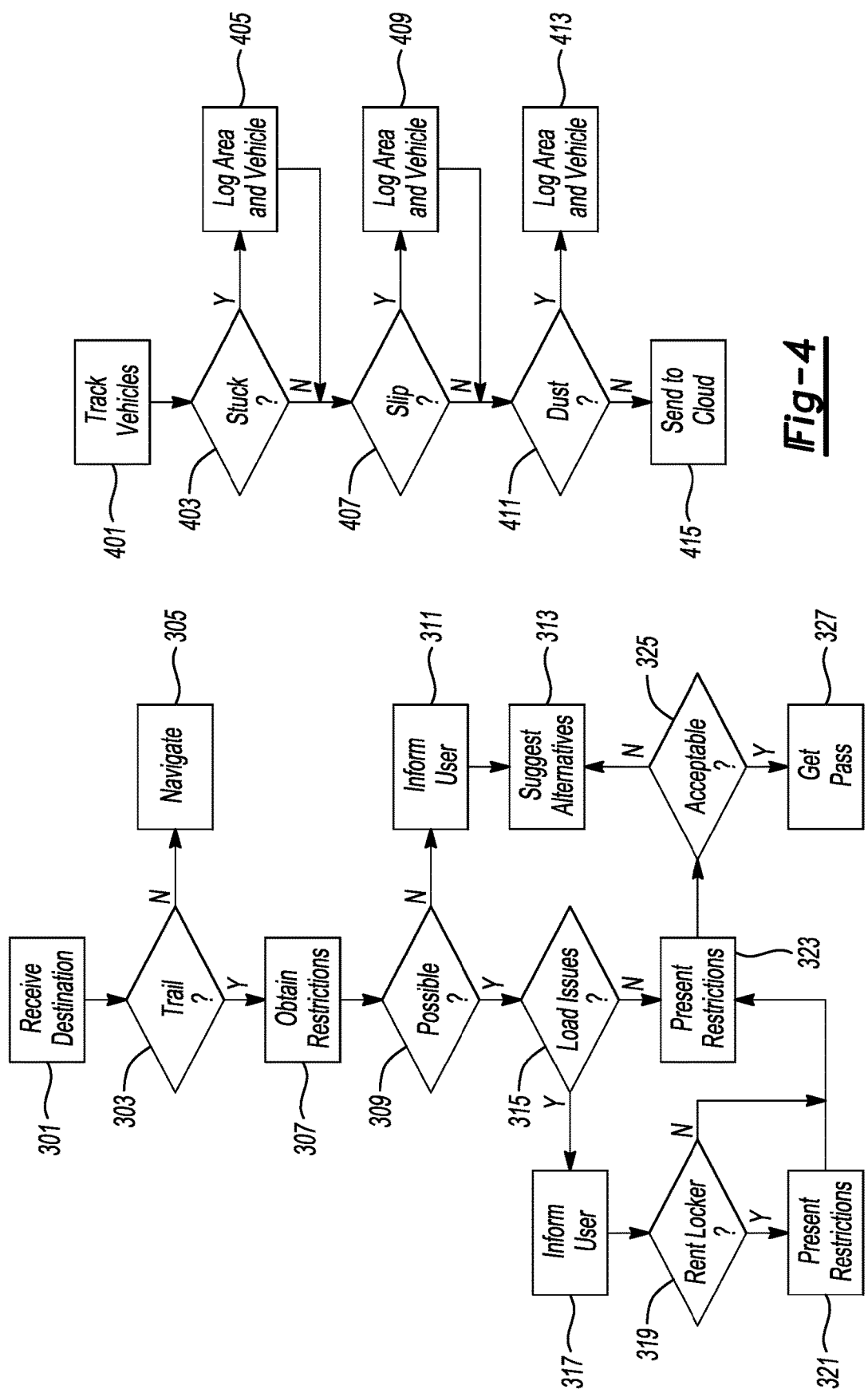

METHODS AND APPARATUSES FOR DYNAMIC VEHICLE ACCESS PERMISSIONING ANALYSIS AND HANDLING

TECHNICAL FIELD

The illustrative embodiments generally relate to methods and apparatuses for dynamic vehicle access permissioning analysis and handling.

BACKGROUND

Off-road caliber vehicles provide an opportunity for owners to explore and travel in unpaved areas and are often purchased with such pursuits in mind. Designed to handle all types of terrain, these vehicles are well-equipped for travel through gravel, mud, sand, etc. Often, however, the owners of such terrain would prefer that the effect of such travel on the terrain was minimized.

High torque battery electric vehicles and low-geared internal combustion engine vehicles can unintentionally create issues with terrain maintenance under certain conditions. While tracks specifically designed for such vehicles may be intended largely for such travel, and thus owners of such tracks are may be less concerned with temporary displacement of terrain, other landowners may prefer to reject travel by such vehicles out of a fear that the vehicles may overly mar the terrain.

At the same time, owners of such vehicles will want to be mindful of such concerns, and further may not always require the maximum capability of their vehicle to travel on such terrain. It may be difficult, however, for a landowner to ensure that any restrictions are being followed, and so the landowner may simply elect to prohibit travel of such vehicles entirely.

SUMMARY

In a first illustrative embodiment, a system includes one or more processors configured to determine that a vehicle is attempting to enter an area designated for off-road travel. The processors are also configured to access use-restrictions stored in a database and associated with the area, the use-restrictions defining at least one vehicle constraint required for the vehicle to travel over one or more locations that are part of the area, the use restrictions defining at least one of vehicle control limiting or vehicle weight maximums. The processors are further configured to determine whether the vehicle follows the use-restrictions based on an assessment of vehicle characteristics compared to the use-restrictions and responsive to determining that the vehicle follows the use-restrictions, providing the vehicle with a digital access pass to the area.

In a second illustrative embodiment, a system includes one or more processors configured to receive a destination for a vehicle, the destination designating an area designated for off-road travel. The processors are configured to, prior to providing navigation, access use-restrictions stored in a database and associated with the area, the use-restrictions defining at least one vehicle constraint required for the vehicle to travel over one or more locations that are part of the area, the use restrictions defining at least one of vehicle control limiting or vehicle weight maximums. Also the processors are configured to determine whether the vehicle follows the use-restrictions based on an assessment of vehicle characteristics compared to the use-restrictions and responsive to determining that the vehicle follows the use-restrictions, provide navigation instructions to the area.

In a third illustrative embodiment, a method includes tracking a vehicle traveling within a bounded off-road area, the vehicle having temporary control constraints imposed on at least one vehicle control system while traveling within the bounded area. The method also includes, based on the tracking, determining that the vehicle has entered a sub-area within the area in which control beyond the control constraints is required based on data known about characteristics of the sub-area, the sub-area independently bounded by an independent boundary associated with the sub-area. The method further includes temporarily removing the control constraints while the vehicle travels within the area until the vehicle leaves the sub-area indicated by the independent boundary associated with the sub-area.

BRIEF DESCRIPTION OF THE DRAWINGS

FIG. 3 shows an illustrative example of a trail use planning process;

FIG. 4 shows an illustrative example of a vehicle tracking process;

DETAILED DESCRIPTION

Figure 1:
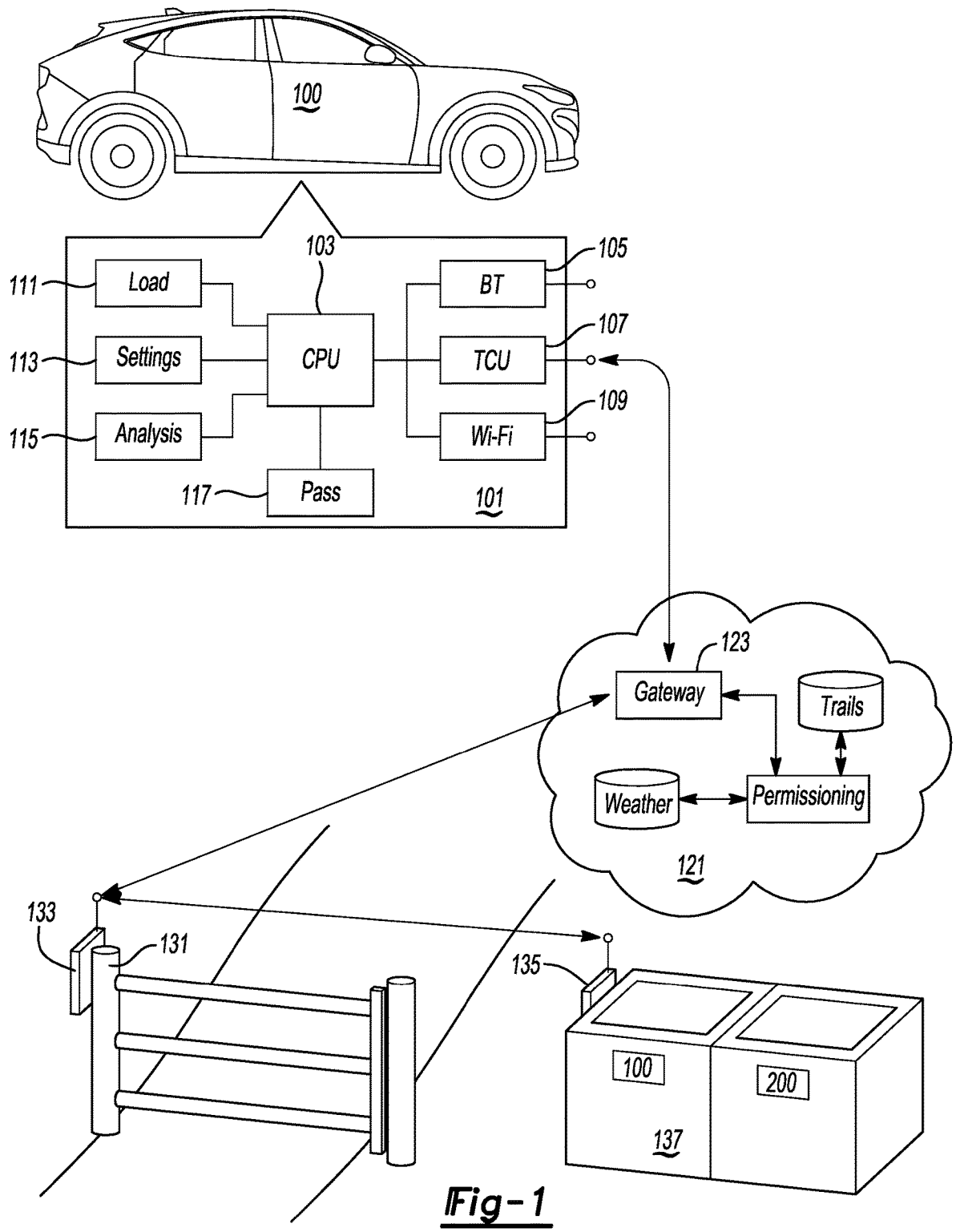
FIG. 1 shows an illustrative example of a vehicle, cloud system and gateway control.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

FIG. 1 shows an illustrative example of a vehicle, cloud system and gateway control. In this example, the vehicle 100 may include an onboard computer system 101 that is capable of dynamic reconfiguration of certain vehicle settings, as well as self-assessment and analysis of the vehicle 100 to ensure that it meets constraints with regards to gated or geo-fenced land with restrictions associated therewith. The vehicle system 101 includes one or more processors 103, as well as BLUETOOTH transceivers, a telematics control unit (TCU) 107 and/or Wi-Fi transceivers 109. These and other communication systems can provide communication with both a cloud system 121 and any local gating system transceivers 133, if the land or trail is physically restricted.

The vehicle computing system 121 may also include a load analysis process 111, which is capable of determining vehicle loading. A settings control process 113 may be able to engage or disengage, or otherwise tune, certain settings to meet restrictions provided by a landowner in exchange for the ability to travel on the land. An analysis process 115 can determine if the vehicle 100 is suitable for travel and/or if it can be rendered suitable for travel based on any known restrictions on the land. A digital pass system 117 can store travel permissions, confirm that the vehicle meets use restrictions and handle any access permissions related to opening physically controlled accesses.

In some instances the pass will be a digital pass related to travel within a geo-fenced area, and may not actually constitute control of a physical system. In those instances, the pass system 117 may store an obtained pass obtained for a vehicle that follows use restrictions (and/or required payment) and may be used to report to the landowner that a vehicle meeting restrictions is traveling within the geofence. The pass may not necessarily be capable of restricting physical vehicle travel (meaning a driver could ignore the restrictions and simply drive on the land), but depending on the arrangement of the system and any local laws, the pass could report unpermitted travel if the vehicle breached a geofence impermissibly and maintained an impermissible presence. Drivers may be willing to accept such restrictions in exchange for the additional access that was generally granted by a digital pass management system by encouraging landowners to realized that travel was being monitored and restriction-following was being determined.

A system maintained by an original equipment manufacturer (OEM) or similar entity may reside remote from the vehicle 100 in the cloud 121. This system may include one or more gateway programs 123 that handle a variety of requests. Requests for entry into a physically or digitally gated area may be passed to a permissioning process 125, which maintains a list of restrictions associated with any areas, as well as being authorized to issue digital passes and gate control privileges for physically gated areas. This process or a similar process may also handle any payments required in exchange for use of land.

Owner restrictions may be stored in one or more trails databases 127, which may include lists of trails and geofenced areas. These restrictions may includes prices for travel, restrictions on weights and other vehicle settings, and any dynamic requirements. Dynamic requirements may be situational requirements, such as requiring reduced loads when there has been significant precipitation. Since a vehicle 100 may not always know how much it has rained on a trail over the past week, for example, the permissioning process may also have access to weather and other databases 129, which can provide the variables necessary for determining the present state of any dynamic restrictions. Once a vehicle 100 has confirmed that it meets the restrictions, such as by using onboard load measuring and dynamic limiting or recalibration, the permissioning process may issue the necessary credentials.

When the land is physically gated 131, the gate may include a transceiver such as a Wi-Fi or BLUETOOTH transceiver 133. The vehicle 100 with proper credentials can send a signal to the transceiver and access the trail. The transceiver may also have the local restrictions stored thereon, and if the vehicle 100 can determine if it meets restrictions, the two systems may be able to negotiate usage in the absence of a cloud system, if the system does not know of the present trail or is unavailable due to non-existence and/or bad connections with long range transmissions.

In some instances, a user may be able to change a load profile by unloading weight from a vehicle 100. If the user does not want to simply leave unloaded items at an entry point, there may be a local locker system 137 that provides wirelessly lockable lockers accessible via transceivers 135. The user can arrange for use of one or more lockers and lock valuables inside, reducing vehicle weight and ensuring security of possessions. This could be provided by a landowner or such systems could be deployed at popular locations by an OEM or other entity.

Figure 2:
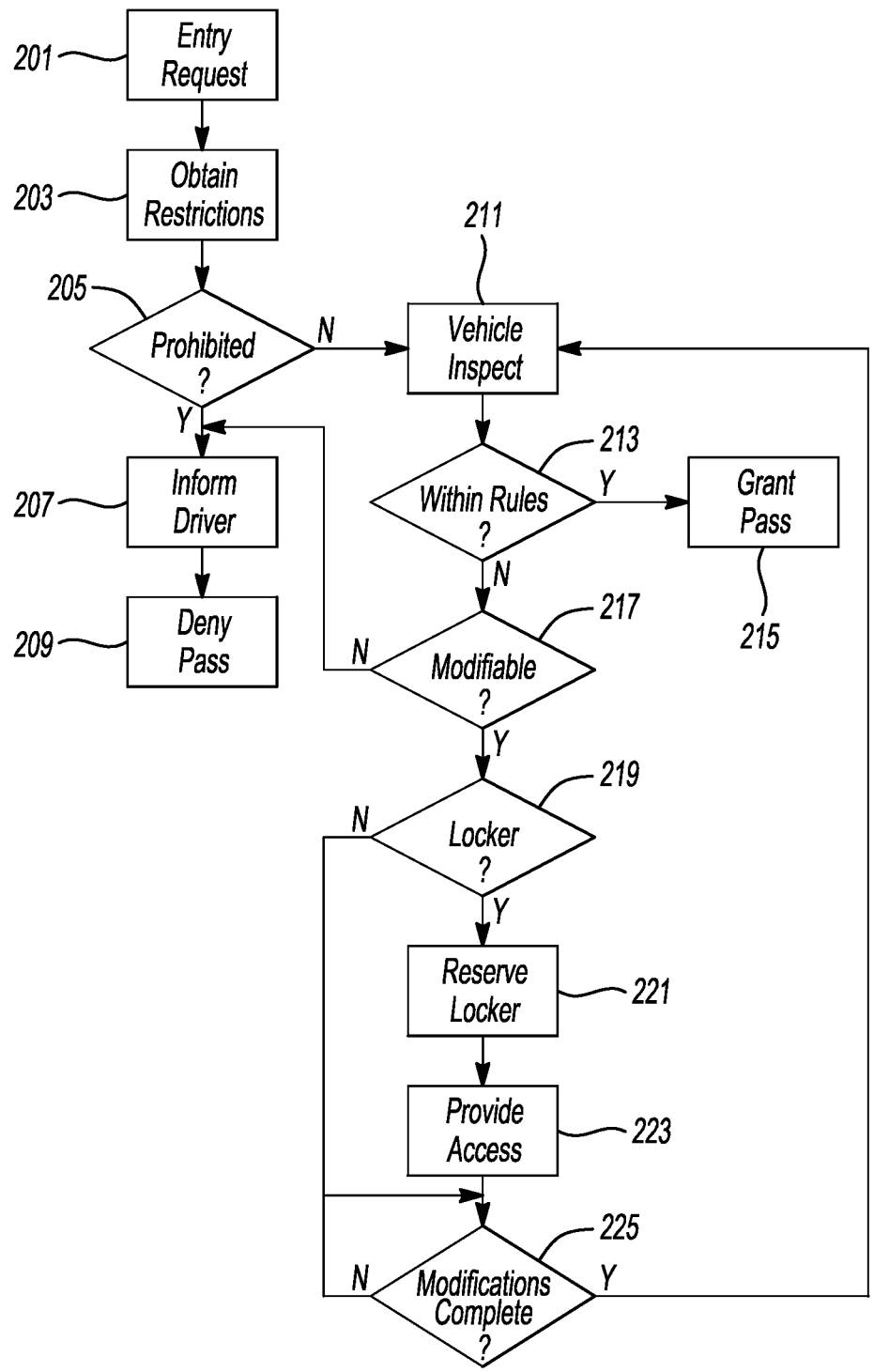
FIG. 2 shows an illustrative example of an entry control process.

FIG. 2 shows an illustrative example of an entry control process. In this example, the process 201 receives an entry request from a vehicle 100. This process could be executing on the vehicle 100 or in the cloud 121. The entry request could be received from a vehicle encountering a geofence or locked gate, or from a gate system or deployed transmitter, communicating with a vehicle. For example, a vehicle could pull up and contact a field-deployed transceiver to communicate vehicle identification. The transceiver could contact the cloud 121 to instruct the cloud to verify the vehicle 100. The cloud and vehicle could ensure the vehicle meets restrictions, and then the cloud could send back the permissioning and confirmation to the transceiver. Some landowners may prefer this model, because it prevents a vehicle from spoofing permission or otherwise faking credentials, as the cloud must ultimately verify the vehicle. Of course, if a geofence is used, there is not likely to be a clear transceiver location for entry, even if some transceivers are deployed about the land, and the landowner may be reliant on vehicle owners to self-identify (which can be automatic in response to encountering or approaching the geofence) and self-verify (which can still be done with the assistance of the cloud).

In this example, when the system receives the entry request at 201, it obtains any restrictions associated with the land. This can be limiting the use of high torque or low gearing, which may be permitted under certain circumstances (hill climbing, stuck vehicle), but which generally may be limited by onboard controls. Weight is another factor that an owner can often control, doing so easily by unloading passengers, and slightly less easily by unloading materials within the vehicle.

In some instances, based on, for example, recent heavy weather, travel may be temporarily or permanently prohibited in an area, and the vehicle 100 will be notified at 207. The vehicle 100 can deny a pass to the land at 209, which can restrict gate opening and/or simply notify a landowner if an unpermissioned vehicle has breached a geofence.

If travel is permitted at 205, the process may inspect the vehicle at 211, which can include using onboard scales and ride height sensors to determine a current vehicle load, as well as determining if the vehicle includes capability to restrict modes of usage such as speed thresholds, torque limits, slip limits, etc. This can also include establishing limited access and creating internal geofences within a larger geofence representing areas that are prohibited for at least this particular vehicle (i.e., if the owner cannot comply or does not want to comply with restrictions that apply to portions of the land, but not all of it. For example, a vehicle may have a known minimum weight with, for example, full fuel and including at least a known driver weight. This may represent the "lightest" the vehicle can be made with this driver.

If the vehicle already meets restrictions at 213, the pass can be granted and the vehicle 100 can enter the land. Otherwise, the process may determine if the vehicle is likely modifiable in the manners required for full or partial access to the land at 217. For example, if the vehicle is overloaded, but the base weight is well below the current load, the process could determine if an onsite locker is available at 219, for the owner to offload gear temporarily. If so, and the owner elects to use the locker, a payment can be arranged at 221 and the corresponding assigned locker can be accessed at 223. If the locker is not available, and/or the locker has been used, the process can wait until the requisite amount of load has been reduced at 225, and then reinspect the vehicle 100.

FIG. 3 shows an illustrative example of a trail use planning process. In this example, the process receives a destination at 301 from an owner that represent an area of intended travel for which restrictions may exist. Since it may be a hassle, if not impractical, for an owner to unload equipment or people when arriving at a remote location, there can be an opportunity to pre-inspect an intended destination to have few complications when the vehicle 100 arrives. This is an example of a process that can analyze the intended area, as well as recommend alternatives if the intended area cannot be used because of certain modifications or requirements that cannot be met, or which the owner is unwilling to meet.

If the destination is an unrestricted area (e.g., a road or even an off-road but unrestricted area) at 303, the process can simply allow navigation to proceed at 305. If there are any restrictions associated with the destination at 307, the process can determine if it is possible or likely possible the vehicle can meet the restrictions at 309. This can include determining if control limits can be imposed and/or if weight requirements can be met, among other things.

If travel is not likely possible at 309 because of restrictions, meaning the user will likely be denied entry upon arrival, the process can inform the user at 311 and compare the intended destination to likely usable alternatives. These can include less restricted or unrestricted areas, as well as areas in a same general locality, a similar distance away, having similar characteristics, etc. The process can suggest one or more alternatives at 313 and the user may have assurances that a restriction analysis has already been done with regards to these areas, so the user can select at trail and know that permission can be obtained and granted.

If travel is possible, in this instance the process considers whether there are currently load constraints that apply to the vehicle at 315. Control issues may be handled automatically onsite by the vehicle, but the user may want to reduce a load while still at home, so as not to leave materials onsite at a trailhead or entry point. Other requirements that can be addressed by physically changing the vehicle may also be considered at this point, where it may be easier and more convenient for a user to make any necessary changes.

If there are no load issues, the process can present any known restrictions at 323, and the user can elect to accept the restrictions at 325 and obtain a pass in advance at 327. Otherwise, if the user does not like the restrictions, alternatives can be presented at 313. In this case, the user may be able to indicate the disfavored restrictions to obtain suggestions that do not include such restrictions.

If there are load or other modifiable issues, the process may inform the user at 317. If there is an available locker or storage area onsite at 319, the process could allow the user to rent a locker at 321, to know one would be reserved. The user may have camping gear or other materials that the user does not want to leave at home, and so might prefer to use storage onsite. Otherwise, the user can see the weight restrictions at 323 and can unload a vehicle 100 until restrictions are met, which can be established through self analysis of the vehicle as noted above.

FIG. 4 shows an illustrative example of a vehicle tracking process. In this example, vehicles 100 already traveling on boundaried land are tracked at 401 to identify areas of complication. This can assist both vehicles and landowners in protecting their interests. If vehicles become mired at 403, experience high slippage at 407, experience high dust at 411, etc., those areas can be respectively logged at 405, 409, 413. The process can sent this information to the cloud at 415 for sharing with vehicles and owners.

Landowners may want to establish temporary restrictions around certain areas where issues are occurring, such as lower weight limits or simply temporarily blocking an area via a geofence. Drivers may want to circumvent such areas, especially if present restrictions limit the driver's ability to navigate the areas fully.

Also, by knowing these areas exist, alerts can be issued to drivers and temporary control constraints may be modified or lifted (with landowner permission) if a vehicle is traveling in one of these areas, to stop the vehicle from becoming stuck, for example. In other cases, temporary control constraints may be imposed, such as speed limiting to reduce dust generation, to allow the drivers in the area to see better. Additionally or alternatively, constraints may be intentionally lifted while a vehicle travels within certain sub-areas—e.g., if a landowner places a mudpit on their land for vehicle travel, vehicles may be constrained until they reach a boundary associated with the mudpit (to protect the rest of the land), and then the vehicle may have the constraints lifted while it is traveling within the mudpit, wherein terrain effects are presumably not minded as much.

Figure 5:
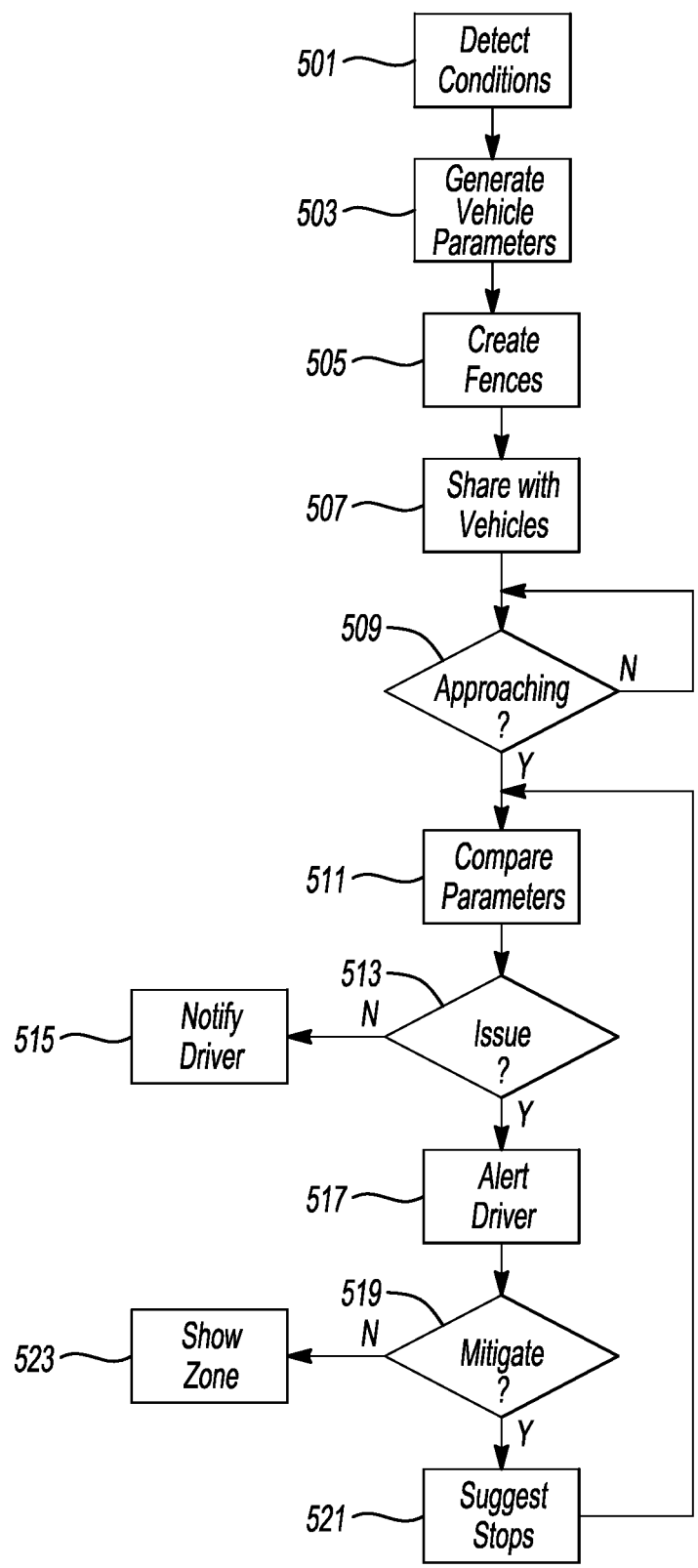
FIG. 5 shows an illustrative example of tracking a vehicle in progress with dynamic control adjustment.

FIG. 5 shows an illustrative example of tracking a vehicle in progress with dynamic control adjustment. This is an example of an ongoing process that can aid a driver in navigating through an area that may include certain potential issues for the vehicle 100. If the driver has entered land with one or more conditions that have been presently or previously observed with regards to this or other vehicles at 501, the process can create a geofence around the vehicle for "encounter" purposes, which essentially allows the vehicle to encounter a geofence before the vehicle actually reaches the geofence. This fence can adapt to vehicle speed, and can represent a trigger event when it, as opposed to the vehicle, crosses a bounded area.

The process can also determine which conditions likely apply to this vehicle and can geofence the areas of likely issue at 505. These can be immediately known (present) issues, as well as issues projected based on historic areas of issue combined with present or recent weather conditions, heavy recent travel, etc. The geofenced areas can be shared with the vehicle at 507 if this fencing and determination occurred offboard, or can be generated by the vehicle 100 itself.

When the vehicle artificial boundary represented by the temporary geofence crosses a geofenced area, the vehicle 100 may be determined to be approaching an area of issue at 509. Speed and heading can also be used to determine likely encounters, and the areas can additionally or alternatively be bounded by wider perimeters (wider than the actual area of issue) to create an encounter event before the vehicle actually encounters an issue.

As the vehicle 100 approaches the area at 509, the vehicle can do a dynamic comparison of present states and capabilities to present conditions at 511 to determine if the issue likely will affect this vehicle at 513. If not, the driver may be notified of the area but informed that the issue is projected to be of limited concern.

If the issue will more likely affect the vehicle at 513, such as the vehicle becoming stuck, heavy slippage, limited visibility, etc., the process may alert the driver more aggressively at 517 and suggest mitigation actions at 519. This can include navigating around the area, limiting speed, etc. This can also include one or more areas where the driver may be suggested to stop travel at 521. If the driver wants to continue at 519, the process may display the areas of issue, which may include more specific mappings of the localities expected to create an actual issue at 523.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
one or more processors configured to:
determine that a vehicle is attempting to enter an area designated for off-road travel;
access use-restrictions stored in a database and associated with the area, the use-restrictions defining at least one vehicle constraint required for the vehicle to travel over one or more locations that are part of the area, the use restrictions defining at least one of vehicle control limiting or vehicle weight maximums;
determine whether the vehicle meets the use-restrictions based on an assessment of vehicle characteristics compared to the use-restrictions;
responsive to determining that the vehicle meets the restrictions, providing the vehicle with a digital access pass to the area;
determine whether a vehicle can comply with the use-restriction; and
responsive to determining that the vehicle cannot comply with the use-restriction because of vehicle characteristics, offer at least one alternative area for travel, wherein an ability of the vehicle to comply with second use-restrictions associated with the at least one alternative area is confirmed prior to the offer.

2. The system of claim 1, wherein the determination that the vehicle is attempting to enter the area is based on the vehicle coordinates being within a threshold distance of a geo-fence surrounding at least a portion of the area.

3. The system of claim 1, wherein the determination that the vehicle is attempting to enter the area is based on the vehicle coordinates being within a threshold distance of a physical gate prohibiting access to at least a portion of the area and wherein the digital pass is usable by the vehicle to wirelessly open the gate.

4. The system of claim 1, wherein the use-restrictions include at least control limiting and wherein the determination whether the vehicle meets the restrictions is based on whether the vehicle includes capability to restrict vehicle functionality in a manner required by the use-restrictions.

5. The system of claim 1, wherein the use-restrictions include at weight maximums and wherein the determination whether the vehicle meets the restrictions is based on whether the vehicle load is above or below the weight maximum based on data received from onboard vehicle load measurement systems.

6. The system of claim 5, wherein the load measurement systems include at least one of weight sensors or ride height sensors.

7. The system of claim 1, wherein, responsive to determining that the vehicle does not comply with a use-restriction related to vehicle weight, the one or more processors are configured to inform a driver how much weight needs to be removed from the vehicle.

8. The system of claim 1, wherein, responsive to determining that the vehicle does not comply with a use-restriction related to vehicle weight, the one or more processors are configured to determine whether the use-restriction related to vehicle weight can be met based at least on a fixed vehicle minimum weight plus a driver weight.

9. A system comprising:
one or more processors configured to:
receive a destination for a vehicle, the destination designating an area designated for off-road travel;
prior to providing navigation, access use-restrictions stored in a database and associated with the area, the use-restrictions defining at least one vehicle constraint required for the vehicle to travel over one or more locations that are part of the area, the use restrictions defining at least one of vehicle control limiting or vehicle weight maximums;
determine whether the vehicle meets the use-restrictions based on an assessment of vehicle characteristics compared to the use-restrictions;
responsive to determining that the vehicle meets the restrictions, provide navigation instructions to the area;
determine one or more alternative areas for off-road travel, each having at least one of either no use-restrictions associated therewith or use-restrictions with which the vehicle can comply; and
present the one or more alternative areas to a driver for selection as an alternative destination.

10. The system of claim 9, wherein the one or more processors are further configured to, responsive to determining that the vehicle does not comply, determine whether the vehicle can comply with the use-restrictions based on known vehicle characteristics.

11. The system of claim 10, wherein the one or more processors are further configured to, responsive to determining that the vehicle can comply with the use-restrictions:
determine if meeting the use-restrictions requires physical modification to a vehicle characteristic; and
responsive to the meeting the use-restrictions requiring physical modification to the vehicle characteristic, inform the driver of the characteristic.

12. The system of claim 11, wherein the physical characteristic includes present vehicle weight.

13. The system of claim 12, wherein the one or more processors are further configured to:
receive indication that the present vehicle weight has been modified;
confirm, using vehicle sensors, that the present vehicle weight is below a threshold indicated by the use-restriction; and
responsive to the confirmation, provide navigation instructions to the area.

14. The system of claim 11, wherein the one or more processors are further configured to:
receive indication from the driver that an alternative location is desired, responsive to informing the driver of the characteristic; and
determine one or more alternative areas for off-road travel, each having at least one of either no use-restrictions associated therewith or use-restrictions requiring at least lesser modification to the physical characteristic; and
present the one or more alternative areas to a driver for selection as an alternative destination.

15. The system of claim 14, wherein the one or more processors are further configured to:
receive indication from the driver that an alternative location is desired, responsive to informing the driver of the control characteristic; and
determine one or more alternative areas for off-road travel, each having at least one of either no use-restrictions associated therewith or use-restrictions requiring at least lesser modification to the control characteristic; and
present the one or more alternative areas to a driver for selection as an alternative destination.

16. The system of claim 11, wherein the one or more processors are configured to, responsive to the meeting the use-restrictions not requiring physical modification to the vehicle characteristic, inform the driver of at least one control characteristic that will be modified while traveling in the area.

17. A method comprising:
tracking a vehicle traveling within a bounded off-road area, the vehicle having temporary control constraints imposed on at least one vehicle control system while traveling within the bounded area;
based on the tracking, determining that the vehicle has entered a sub-area within the area in which control beyond the control constraints is required based on data known about characteristics of the sub-area, the sub-area independently bounded by an independent boundary associated with the sub-area; and
temporarily removing the control constraints while the vehicle travels within the area until the vehicle leaves the sub-area indicated by the independent boundary associated with the sub-area.

18. The method of claim 17, wherein the control constraints include at least one of torque constraints, slip limits or yaw limits.

* * * * *